3,190,786
DECORATIVE LAMINATED PAPER

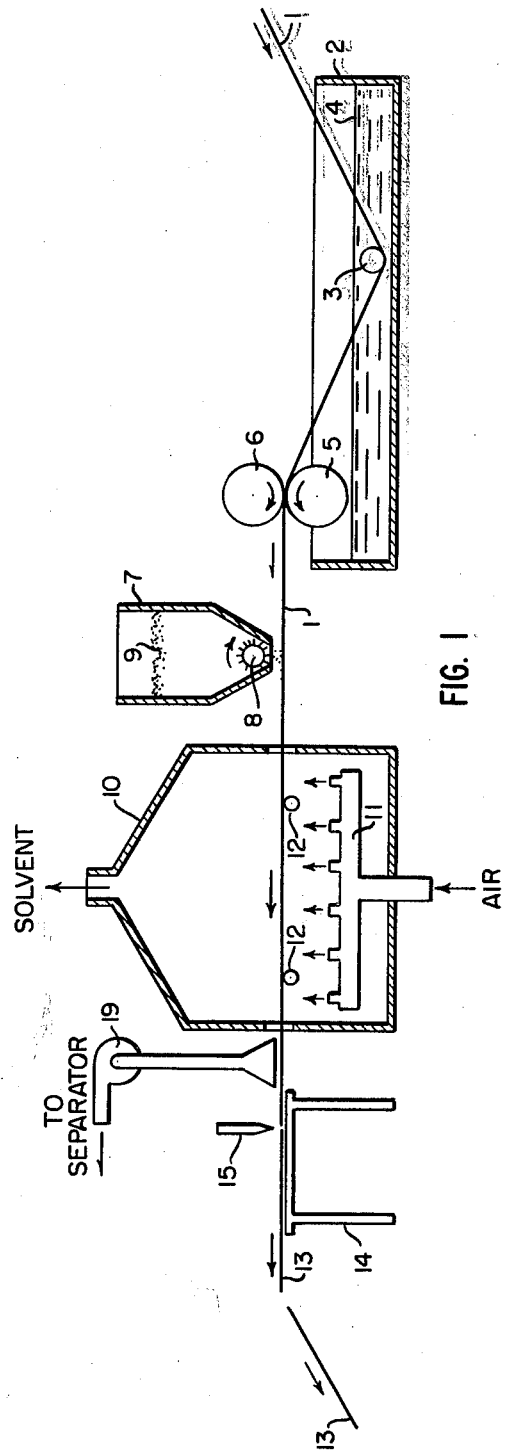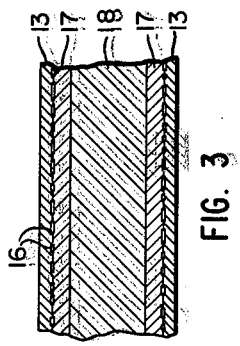

Jacques R. Magill, Shirley, and Walker Hamilton, Jr., Leominster, Mass., assignors, by mesne assignments, to Fitchburg Paper Company, a corporation of Delaware, wholly owned subsidiary of Litton Industries, Inc., a corporation of Delaware
Filed May 10, 1961, Ser. No. 109,030
2 Claims. (Cl. 161—5)

Our invention relates to laminated paper for use in the construction of decorative articles such as counter and table tops and the like, and particularly to an improved decorative laminate in which decorative particles are concentrated in a thin layer or layers, on one or more surfaces of the paper laminations, and to a novel process of making the same.

Laminated paper is made by stacking sheets of paper impregnated with thermosetting resin in a press, and curing the resin with heat and pressure. The laminate may be finished on one side, or both sides, but if finished on both sides, it frequently consists of a thick central core sheet comprising one or more sheets of unbleached kraft paper impregnated with a thermosetting resin such as a phenol-formaldehyde resin, or the like, a print sheet of paper, which may be colored or otherwise decorated, on either side of the core sheet, and, optionally, a thin sheet of overlay paper on top of each print sheet to form the outer surface of the laminate. The print and overlay sheets are usually impregnated with a thermosetting resin which is highly resistant to heat and chemical action, such as melamine-formaldehyde resin or the like.

Since laminated paper of the class described is used primarily for exposed surfaces, such as counter tops and the like, its appearance is of great importance, and much effort has been devoted to the creation of a wide range of decorative effects. One such effect that has met with wide acceptance is produced by incorporating flecks or particles of a metal or alloy such as aluminum or brass in either the print sheet or the overlay sheet. Prior to our invention, this has been done by mixing metal particles with the pulp, or paper furnish, prior to paper making. However, this process has a number of disadvantages. The forming wire of a conventional Fourdrinier paper machine consists of fine wire screen, which becomes clogged with the metal particles, and which it is extremely difficult and expensive to clean. This makes it necessary to limit the number of particles used, and to make them large compared to the mesh size of the forming wire. Moreover, only a small amount of metal can be included in the pulp without affecting the strength of the paper, so that the only decorative effects that can be produced in this way are those that can be achieved with a random scattering of relatively widely spaced particles. In addition, the heavier grades of metalized paper produced in this way are quite expensive, since the cost of the metal is greatly in excess of the cost of the pulp that it replaces, and in order to obtain a sufficient concentration of particles at the surface of the sheet, the same concentration must be incorporated in the body of the sheet.

It is the object of our invention to increase the range of decorative effects that can be achieved in metalized laminated paper. In accordance with our invention, metal patricles may be applied to the core sheet, the print sheet, or the overlay sheet, or if desired, to more than one sheet. Preferably, paper is used in the manufacture of the overlay sheet, and may also be used in the manufacture of the print sheet. The overlay paper is of alpha pulp, rayon or similar natural and synthetic fibre or mixtures thereof. This paper becomes translucent or transparent when impregnated with resin and cured. In this manner, a three dimensional decorative effect may be achieved by the use of layers of metallic particles at different depths in the finished laminate.

In the manufacture of metalized paper in accordance with our invention, the metallic particles are not incorporated in the paper furnish during the manufacture of the paper, but are applied to the paper after it has been saturated with the resin impregnant and before the impregnant has been dried. We have found that at this stage of the process, the surface of the paper retains sufficient adhesive qualities to hold an appreciable proportion of an applied metallic powder, which can be of a sufficient amount to entirely cover the surface of the paper, or can be of limited amount or of uneven distribution for a variety of special decorative effects. In brief, the novel process of our invention takes advantage of this property of the saturated paper, and consists in the steps of distributing a metal powder over the surface of the paper on the machine, between the saturation point and the point at which the paper is dry, either uniformly, or in a desired decorative pattern, evaporating the solvent used to disperse the resin, and removing the excess particles of metal by agitation or by brushing, whereafter the dried paper is then cut and processed in the usual manner. The removed particles of metal may be reused, after collecting and drying, if necessary. Thus, the amount of metal powder used in the finished product is only that which is at the surface of the paper, where it best serves its intended purpose. Moreover, the application of the powder at the surface of the paper permits a variety of decorative effects other than that obtainable by mixing the powder uniformly with the pulp. Most importantly, the range of sizes of metal particles, and the amounts which can be used, are much greater than is possible with processes in which the particles are mixed with the paper furnish. Other objects and further advantages of our invention will become apparent to those skilled in the art as our description proceeds.

Our invention will best be understood by reference to the accompanying drawings, together with the following detailed description, of a preferred embodiment thereof.

In the drawings,

FIGURE 1 is a schematic diagram of the apparatus employed in the manufacture of metalized laminated paper in accordance with our invention;

FIGURE 2 is a fragmentary cross-sectional view of a sheet of metalized paper made by the process of our invention; and FIGURE 3 is a cross-sectional view of a portion of a metalized paper laminate in accordance with our invention.

The novel metalizing process of our invention can be applied to any of the sheets used in the manufacture of laminated paper, but for simplicity it will be here described as applied to the manufacture of a metalized overlay sheet.

Referring now to FIGURE 1, we have illustrated our process as applied to a sheet 1 of a suitable overlay paper, which for example can be of pure white stock of from 20 to 40 pounds in weight on the basis of a ream of 500 24" x 36" sheets. This paper may be taken from a suitable supply roll, or, if desired, may be taken from the finish rolls of the paper making machine.

The sheet of paper 1 is impregnated in a tank 2 by passing it under an idler roll 3 beneath the surface of a quantity of liquid impregnant 4. The liquid impregnant may be any suitable resin composition of the type used in laminating paper, which has the property of being somewhat adhesive before drying, and which can be hardened by heat and pressure to an insoluble, infusible state. For example, either an alcohol or aqueous suspension, or a suspension in a mixture of the two, of melamine-formaldehyde resin may be employed. The excess impregnant is removed from the sheet by a pair of saturating rolls 5 and 6. Since the details of the construction and manner of mounting of these rolls are conventional and well known to the art, they will not be described in detail. In practice, the impregnated paper will retain approximately twice its weight of resin.

Our invention may also be used with the polyester and "Dapon" processes, using monomeric styrene and methyl ethyl ketone, respectively, as the solvent.

After the sheet 1 has been saturated, and before it is dried, we have found that the surface of the sheet has sufficient adhesive properties to retain a substantial quantity of an applied metallic powder, or metal particles or flakes. The size and shape of the particles, and the nature of the metal, are not critical; for example, we have employed powders and particles of brass, bronze and aluminum with equally good results. In addition, various other decorative particles of glass, mica, plastic or the like may be employed instead of, or in conjunction with, the metal particles, to achieve an extended range of decorative effects, without departing from the scope of our invention. The metallic particles may be applied in various ways to achieve different decorative effects, but for example, may be applied by means such as a hopper 7 provided with a slot at its lower end and a rotating feed brush 8 for metering powder onto the surface of the saturated sheet 1 from a supply 9 in the hopper.

After the metallic particles have been applied to the surface of the sheet, the sheet is passed to a conventional tunnel dryer 10, where the water, alcohol or other solvent employed to disperse the resin is removed by means such as jets of hot air from a manifold 11, as shown. These jets may also be used to suspend the sheet 1 while in the dryer 10, and if desired, this air suspension may be augmented by one or more rolls 12 which serve to maintain the sheet in a reference position.

After emerging from the dryer 10, the sheet is dry and relatively brittle. At this point, any loose particles may be removed by means such as a conventional vacuum nozzle 19, which may transmit the loose particles to a conventional cyclone separator, not shown, for reuse. If it is desired to achieve a scrolled or swirled effect, means such as a rotary brush, not shown, may be mounted ahead of the vacuum nozzle 19 to loosen additional particles in a patterned manner. The loose particles can also be removed by mechanical agitation if desired. However, if the metalized surface is to be an interior surface in the final laminate, the means for removing the loose particles may be omitted, if desired, without departing from the scope of our invention in its broader aspects.

In a conventional manner, the sheet is cut by passing it over a table 14 beneath a knife schematically shown at 15, where it is cut into sheets 13 of desired length.

FIGURE 2 shows a cross section through a finished sheet 13. As shown, the sheet comprises the impregnated and dried base paper 1, on the surface of which are a desired concentration of adhering particles of metal 16. These particles may be sufficiently numerous to give the sheet an overall metallic luster, or may be scattered lightly over the surface, and they may also be unevenly distributed in various designs and patterns by varying either the manner of application of the particles on the saturated sheet or the manner in which the excess particles are removed after drying.

Various decorative effects may also be achieved by using different powders mixed together, or by using particles of different metals in sequence.

The finished overlay sheets 13 may now be manufactured into a paper laminate. FIGURE 3 shows a typical laminate, comprising overlay sheets 13, print sheets 17, and a core sheet 18. In the specific example here described, the overlay sheets are laid over the print sheets with the metalized surface on the inside, and the laminate is cured by placing it between the polished plates of a heated press, and curing the resin to a hard, insoluble, infusible state by the action of heat and pressure in a conventional manner. If the overlay paper base sheet is of a sufficiently high quality, it will become transparent after curing, so that the particles are easily visible. However, it is also within the scope of our invention to apply the overlay sheet with the metallic particles on the outside, or to apply the particles to the outside or inside of the print sheet or to the outside of the core sheet. Since the print sheet normally weighs from 65 to 125 pounds per 24" x 36" ream, it will be apparent that a very high quality paper must be employed if the metalizing process is applied to the core sheet. At the same time, the advantages of our invention will be apparent when it is considered that if the metalizing process is applied to the outside of the print sheet, a colored print sheet or print sheet of lesser quality may be employed, thus increasing the possible range of decorative effects which may be achieved.

While we have described various embodiments of the novel metalized laminate of our invention, and the novel process of making the same, in detail, many changes and variations will be apparent to those skilled in the art after reading our description, and such can obviously be made without departing from the scope of our invention.

Having thus described our invention, what we claim is:

1. A paper laminate comprising a plurality of sheets of resin impregnated paper in stacked array and bonded together by the said resin, the sheet at one outside surface being a transparent overlay sheet having particles of metal bonded to its inside surface, and the next adjacent sheet being a print sheet having a decorative surface adjacent to said inside surface of said overlay sheet, the said metal particles thereby lying adjacent to said decorative surface and being separated from the outer surface of the laminate product by the said overlay sheet.

2. In the manufacture of paper laminate composed of a print sheet having a decorative surface and a transparent overlay sheet laminated together by means of an impregnant resin, with the overlay sheet at the surface and the print sheet in the next layer, the improvement comprising forming the overlay sheet by impregnating a paper sheet with an adhesive resin, applying decorative particles of metal to a surface of said sheet, causing said resin to harden and removing loose particles of metal from said sheet, and thereafter laying said particle-covered surface of said overlay sheet adjacent to the decorated surface of said print sheet and completing the manufacturing process.

References Cited by the Examiner

UNITED STATES PATENTS

| | | | |
|---|---|---|---|
| 940,188 | 11/09 | Peterson | 156—301 |
| 1,037,515 | 9/12 | Oeser. | |
| 2,168,896 | 8/39 | Ames | 156—279 |
| 2,617,750 | 11/52 | Le Clair et al. | 161—413 |
| 2,857,302 | 10/58 | Burton et al. | 161—413 |
| 2,904,918 | 9/59 | Frank | 156—279 |
| 2,986,198 | 5/61 | Kolker et al. | 161—212 |

EARL M. BERGERT, *Primary Examiner.*

RICHARD D. NEVIUS, *Examiner.*